United States Patent [19]

Giardini et al.

[11] 4,455,490
[45] Jun. 19, 1984

[54] STARTING APPARATUS FOR INTERNAL COMBUSTION ENGINES

[75] Inventors: Dante S. Giardini, Dearborn Heights; Lawrence R. Foote, Birmingham, both of Mich.

[73] Assignee: Ford Motor Company, Dearborn, Mich.

[21] Appl. No.: 368,935

[22] Filed: Apr. 16, 1982

[51] Int. Cl.³ .................... F16D 27/10; F02N 15/06
[52] U.S. Cl. ........................ 290/38 A; 74/6; 74/7 R; 192/41 R; 192/54; 192/94
[58] Field of Search ............. 290/38 A; 74/6, 7, 7 R; 192/41 R, 54, 94

[56] References Cited
U.S. PATENT DOCUMENTS

| | | | |
|---|---|---|---|
| 1,817,179 | 8/1931 | Dow | 74/7 R |
| 4,064,765 | 12/1977 | McBride | 74/7 R X |
| 4,092,870 | 6/1978 | Giometti | 74/7 R |

Primary Examiner—J. V. Truhe
Assistant Examiner—Terry Flower

Attorney, Agent, or Firm—Joseph W. Malleck; Olin B. Johnson

[57] ABSTRACT

An apparatus combination for improving the starting mode of a starter for an internal combustion engine is disclosed. The combination comprises a supporting means effective to support the starting motor armature, both for rotary movement about an axis within the field winding and for axial movement in response to the axially directed magnetic forces of the winding. Friction means are employed to sequentially engage each of two conical surfaces carried by the member to be driven by the starter motor, such sequential engagement being in response to the axial movement of the armature. Means are also disclosed to assist the frictional engagement between the conical surfaces of the driven member by use of a resilient ring which allows full metal-to-metal contact between the friction means and driven member, but also provides extended interengagement with the friction means by distortion of the ring along a tangent to the friction means.

17 Claims, 6 Drawing Figures

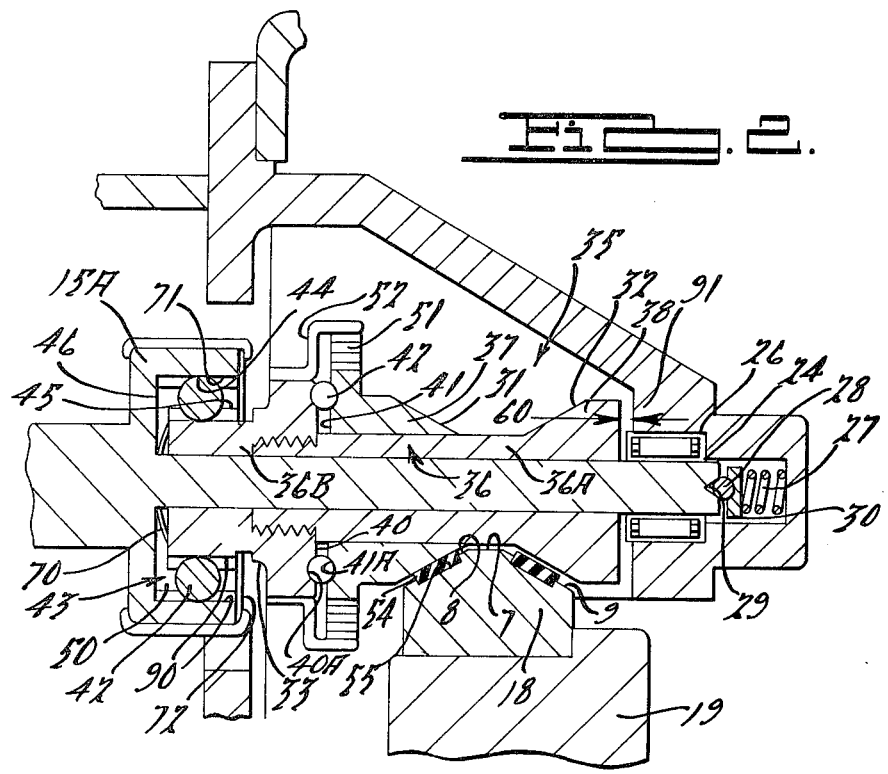
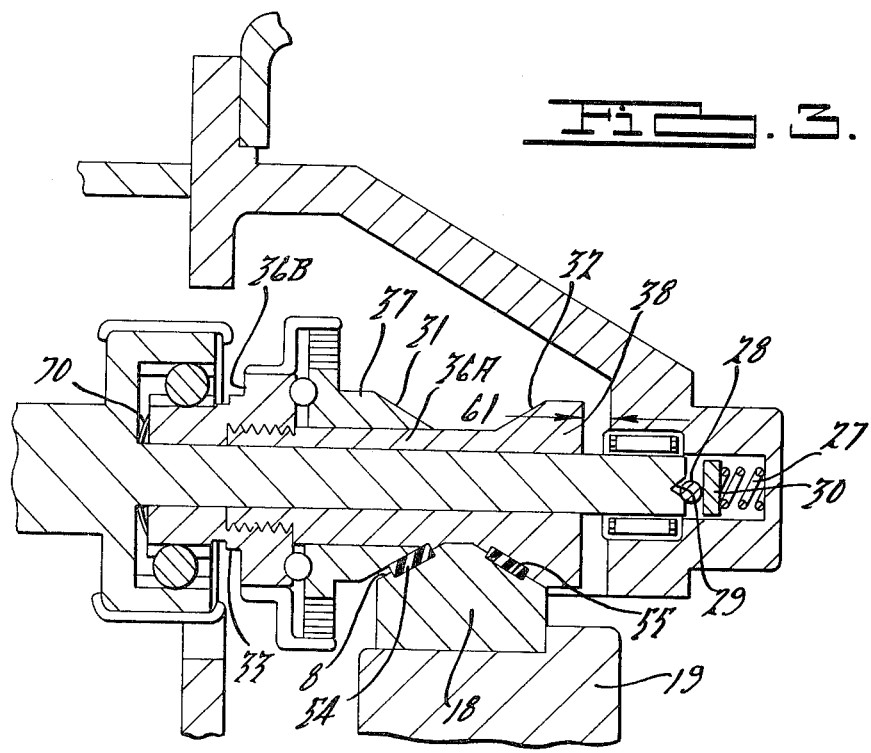

STARTING APPARATUS FOR INTERNAL COMBUSTION ENGINES

BACKGROUND OF THE INVENTION AND PRIOR ART STATEMENT

For decades the automotive electric starter for internal combustion engines has remained essentially unchanged. It is a low-cost accessory that has performed well under adverse conditions. However, such standard production starters must attain a zero rotational speed prior to reengagement to prevent gear tooth damage. This requires that the starter motor be braked to a stop after disengagement. Should the engine stall after the first crank, a second cranking can be carried out. The braking of the starter motor is normally achieved by use of excessive brush pressure and drag. This results in shortened brush life and has thereby limited the potential life of the standard automotive starter system. Some limitation of life potential is also due to bearing wear caused by tooth vibration accompanying gear tooth interengagement.

An automatic restart system without gear tooth engagement would be most desirable for automotive use because the potential for increased life would be much greater. There have been previous attempts to devise toothless pinion and flywheel starter systems to eliminate gear and noise problems; an early example of this is shown in U.S. Pat. No. 1,817,179. In this patent, the friction means is comprised of a pair of cooperating cylindrical claws which frictionally grip the sides of the flywheel rim. The claws have a friction face, for engaging the flywheel rim, which are disposed substantially in a plane transverse to the start shaft. To move the claws together into a gripping relation, a cam roller is keyed to the armature shaft so as to rotate therewith and force a cam follower on one of the slidable claws to move toward the other claw in response to relative rotation. This apparatus is undesirable because it will have a slow response in cycling for restarting due to the lack of an overrunning clutch and due to the necessity for overcoming a coil compression spring attempting to maintain separation between the claws. Operating deficiencies will arise because of the use of coil compression spring which tends to jam up and become wrapped during operation, preventing a smooth and quick release upon overrunning. Due to the use of solely a metal-to-metal interengagement at the friction faces, nonuniform friction will be produced which will not be proportional to the torque of the starting motor. Such device as illustrated in this patent has not been used commercially, principally because it has a low efficiency of operation.

In U.S. Pat. No. 4,092,870, an engine starting mechanism is disclosed which uses two gripping rollers, the control roller of which is forced toward the other roller for gripping of a flywheel as a result of inertial forces. The control roller is caused to be screwed toward the other. This apparatus is deficient because it relies upon screw threads to promote interengagement between the gripping rollers or claws and because it uses rubber inserts for a *total* rubber-to-metal interengagement, the friction of which cannot be consistently controlled at all times. Due to the abrupt angle between the interengaging faces of the sides of the flywheel and the gripping rollers, additional problems will be encountered in friction control. This device will have a relatively slow response in recycling for restarting due to the absence of an overrunning clutch and the necessity for the flywheel to unscrew the control roller by overcoming the compression spring.

SUMMARY OF THE INVENTION

The invention is an apparatus combination for improving the starting mode of a starter for an internal combuston engine. The apparatus for the starter comprises a conventional annular driven member carried by the engine flywheel and has a starter motor with a field winding and armature, the driven member having opposed conical surfaces related to each other to present a common crest forming the outermost radial extremity of the driven member. The inventive combination comprises a supporting means effective to support the starting motor armature, both for rotary movement about an axis within the field winding and for axial movement in response to the axially directed magnetic forces of the winding. Friction means are employed to sequentially engage each of the surfaces of the driven member in response to the axial movement of the armature. Lastly, means are employed to assist the frictional engagement between the surfaces of the driven member and the friction means.

Preferably, the friction means comprises a sleeve slidably mounted on the armature and coupled thereto for conjoint rotation, a metallic response roller integral with said sleeve, and a metallic control roller slidably mounted on the sleeve and coupled thereto for rotation with the sleeve in one driving rotatable direction. The control roller is engageable with one of the conical surfaces of the driven member in response to axial movement of the armature, and the response roller is engageable with the other conical surface of the driven member in response to a camming action initiated by relative rotation between the rollers. Advantageously, the camming action is effected by use of opposed camming surfaces, transverse to the armature axis, and disposed on each of said control roller and sleeve, with camming elements, such as rollers, disposed therebetween. The force of said camming action is preferably proportional to the torque of the armature. It is desirable to use a release means for said friction means which permits the rollers to automatically disengage from the driven member upon its overrunning of the armature. Such release means may advantageously take the form of a helix coil spring providing the sole driving connection in one rotatable direction between the control roller and the armature, the spring unwrapping in the other rotatable direction.

The supporting means may preferably comprise roller bearings providing not only freedom for rotation but also axial movement. The supporting means also may comprise a resilient member effective to normally bias the armature to a first axial position and to allow said armature to shift to a second axial position when said resilient member is overcome.

The means assisting frictional engagement preprefer-ably may comprise at least one resilient, compliant ring carried by the driven member, the ring having a higher coefficient of friction than either the rollers or driven member. The ring may be carried in an annular recess in the driven member and project above the recess to warp tangentially along the periphery of the roller to thereby extend the area of engagement between the roller and driven member. Such friction assisting means is further facilitated by controlling the included angle between the opposed conical surfaces of the driven member to be in excess of 90° and advantageously in the range of 95°–160°.

BRIEF DESCRIPTION OF THE DRAWINGS

FIGS. 2 and 3 are enlarged view of a portion of the starting apparatus of FIG. 1 illustrating different operative positions;

DETAILED DESCRIPTION

Figure 1:
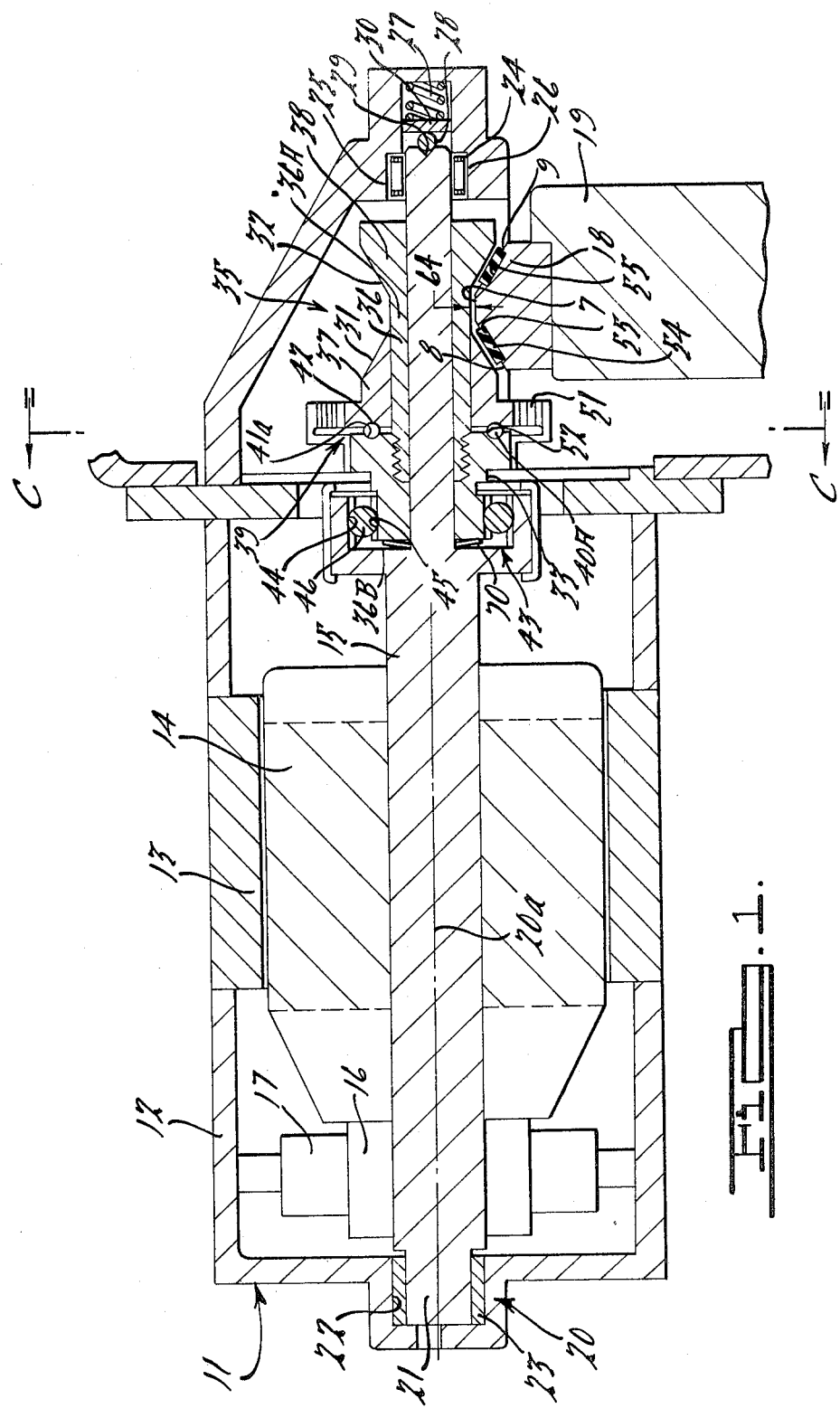
FIG. 1 is a central sectional view of a starting apparatus for an internal combustion engine embodying the principles of this invention.
Figure 4:
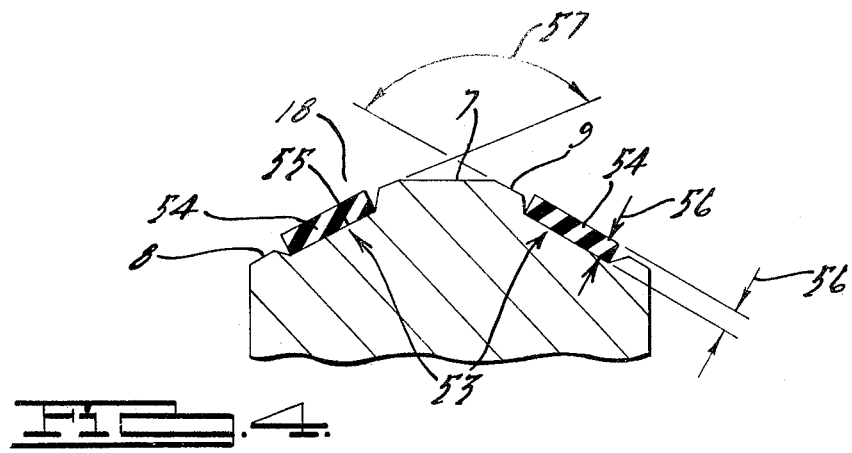
FIG. 4 is an enlarged sectional view of the driven member.
Figure 5:
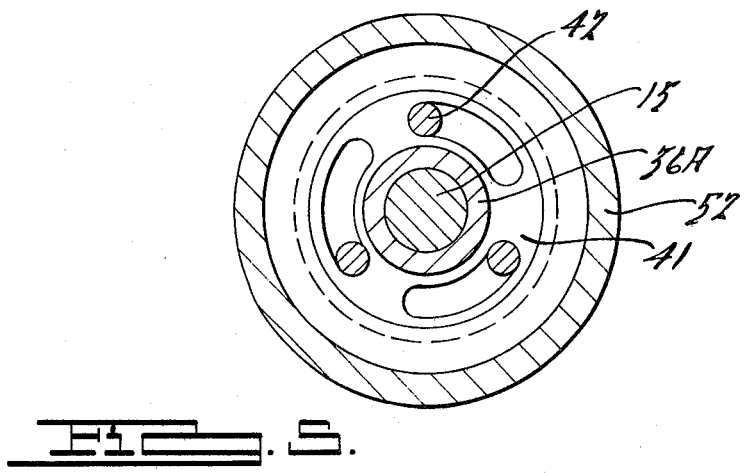
FIGS. 5 and 6 are sectional views taken along line C—C of FIG. 1 illustrating different operative positions of the camming means.
Figure 6:
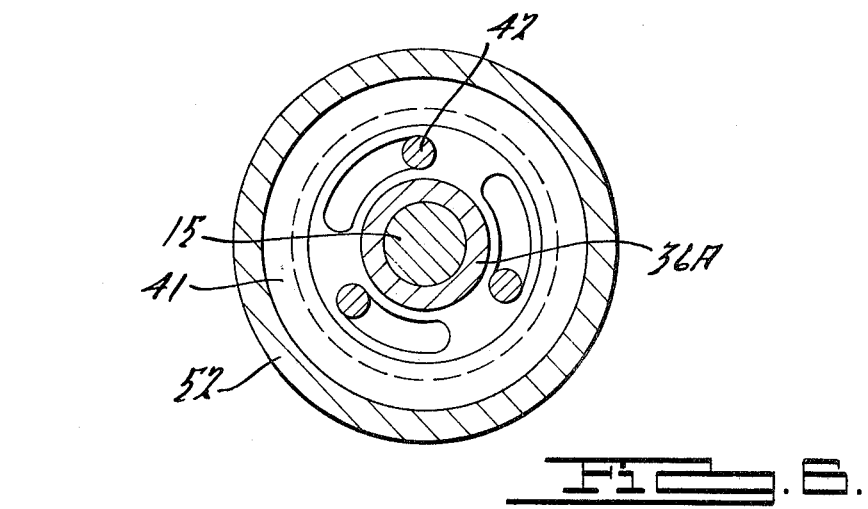

Turning now to FIG. 1, a preferred embodiment of an electrical engine starting apparatus of this invention is illustrated having an electrical starting motor 11 of the low voltage DC current type and a driven member 18 carried by the flywheel 19 of the engine. The driven member has opposed conical surfaces 8 and 9 related to each other to present a common crest 7 forming the radial extremity of the driven member. The included angle 57 between the surfaces is any angle greater than 90°, preferably in the range of 95°–160° and optimally about 125°. The motor is conventionally connected to a storage battery by way of necessary electrical leads, including a switch for manually controlling the use of the starting apparatus. The starter motor comprises a steel housing 12 carrying a field coil assembly 13 on its inner surface thereof. The assembly 13 includes steel pole shoes arranged circumferentially around the housing and field coil windings about each of the poles. An armature assembly 14 is disposed within the field coil assembly for rotation therein and consists of a slotted iron core having flat coils fitted into the slots of the armature core and insulated therefrom. The armature assembly 14 has a shaft 15 rotatably supporting the armature coils and supporting a commutator 16 with brushes 17. The coils of the armature are connected to the commutator so that the current from the brushes flows through all the armature coils at one time creating a magnetic flux field and through the field coil creating other magnetic fields. The cutting of flux fields of the armature coils by the field coil flux field creates a resultant force of rotation having an axial component. This axial component is a result of the magnetic alignment force rule.

Suporting means 20 is effective to support the armature assembly 14 for rotary movement about axis 20a within the field winding assembly 13 and for limited axial movement in response to a resultant magnetic force in an axial direction to the right as viewed in FIG. 1. The supporting means 20 comprises a housing journal 22 adapted to receive the commutator end 21 of the armature shaft 15; end 21 is supported therein for rotary movement by a plurality of needle bearings 23 interposed therebetween. The drive end 24 of the armature shaft is received in a housing journal 25 between which are interposed needle bearings 26. The needle bearings are of sufficient axial length to permit limited axial displacement of the armature shaft in response to the resultant magnetic force. A coil compression spring 27 is disposed to operate between an end surface of the journal 25 and a disc 30 which transfers the force of the compression spring by way of a ball bearing 28 to a conical seat 29 centered in the drive end 24 of the armature shaft. Thus, during the inactive or nonenergized condition of the starting motor, the armature shaft will be biased to the left by spring 27 to a first axial position shown as the left-hand extreme position of FIG. 1. Upon energization of the field coils and armature windings, the resultant axial directed force of such fields (about 10–12 foot/pounds) will overcome the force of spring 27 (about 5–9 foot/pounds) and move the armature shaft to the right a distance within the range of 0.1–0.2 inches, preferably 0.125 inch, and to a second axial position as shown in FIGS. 2 and 3 leaving a reduced distance 60 between housing 91 and roller 38.

A friction means 35 is employed to sequentially engage each of the surfaces 8 and 9 of the driven member in response to the axial movement of the armature. The friction means comprises relatively axially and rotationally moveable friction rollers 37 and 38, each having respectively a conical surface 31–32, mateable with one of the surfaces 8–9 of the driven member. A sleeve 36 is slidably mounted on the armature shaft 15 and is coupled thereto for conjoint rotation. The sleeve consist of a part 36a which extends a distance along the narrowed portion of the armature shaft 15, generally in line with the driven member, and a part 36b which is threadably joined to the left end of the sleeve part 36a. Roller 38, which hereafter is called the response roller 38, is integrally constituted as part of sleeve part 36a at the remote end. Roller 37, hereafter called the controller roller, is mounted and journalled about the exterior surface of sleeve part 36a and adapted for axial sliding movement thereon.

The sleeve 36 is drivingly connected to the armature shaft by means 43. Means 43 preferably consists of an outer race 44 integral with shaft 15 and defined as an interior surface on a hub extending from shaft 15. Inner race 45 is defined on an exterior surface 33 of the inner end sleeve part 36b. Ball bearings 46 are received in axially directed grooves defined in these races in a manner so as to transmit direct rotary motion between the races while permitting movement in an axial direction between said parts. The balls 46 sit and are locked against rotation relative to the races, but are free to roll axially within the grooves 90. A belleville spring 70 is used to bias race 45 to the right so that shoulder 71 engages a stop plate 72 attached to race 44.

Alternatively, means 43 may comprise a one-way sprag clutch with the ball bearings 46 displaced by sprags. The inner and outer races would be defined to permit driving rotation in one direction while permitting free movement therebetween in the opposite direction. This alternative is not a requirement for this type of electric starting apparatus because of the unique friction drive deployed herein.

Friction means 35 also comprises a camming means 39 effective to bring the response roller 38 into engagement with the other of the conical surfaces 9 of the driven member (preferably requiring an axial movement of about 0.062–0.125 inch, leaving an increased space 61 between the housing 91 and the response roller 38) in response to relative rotation between the response and control rollers. The camming means 39 includes a first camming surface 41 on the sleeve part 36b and a second camming surface 40 on the transversely extending member of the control roller, the first and second camming surfaces being disposed transverse to armature axis 20a for camming in a direction along the axis.

Camming elements 42 are disposed between these surfaces and are received in arcuate grooves 40a and 41a respectively in the camming surfaces. Upon relative rotary motion between the armature shaft, the camming elements 42 will be forced to move along the arcuate grooves which are biased with respect to the plane separating said surfaces, thus forcing the surfaces 40 and 41 further apart. Since the control roller is already in contact with the driven member, axially directed thrust forces cause the response roller to move toward the driven member and achieve contact. The response roller 38 is normally maintained in the right-hand extreme position by way of biasing spring 70 urging sleeve 36 to the right and maintains a spacing between surface 9 and the control roller of about 0.062–0.125 inch.

Friction means 35 further comprises a release means 51 which permits the release of the rollers 37–38 from the driven member upon the overrunning of the flywheel with respect to the starter motor. Release means 51 is a helix coil spring which transmits rotary drive between the armature 15 and control roller 37 in one rotatable direction. The spring has one end connected to the peripheral extremity of the control roller 37 and an opposite end connected to a bracket 52 secured to sleeve part 36b.

The apparatus of this invention lastly comprises friction assisting means 53 effective to assist the frictional engagement between the driven member and the friction means. Means 53 comprises resilient friction rings 54 carried in annular recess 55 of the driven member. The rings have an unflexed thickness 56 sufficient to extend out of the recesses. During the metal-to-metal engagement between the rollers and the driven member, the rings will be compressed into the recesses, but frictional gripping is increased by the resilient warping of the ring in a direction tangent to the roller surface. The friction rings are preferably comprised of urethane rubber having a coefficient of friction higher than that of the metal roller surfaces or driven member and having good thermal conductivity. The rings have a cross-sectional shape effective to fit snugly within the recess 55.

We claim:

1. In an internal combustion engine starting apparatus having an annular driven member carried by the engine flywheel and a starter motor with a field winding and armature, said driven member having opposed conical surfaces related to each other to present a common crest forming the outermost radial extremity of said driven member, the combination comprising:
    (a) supporting means effective to support said armature for rotary movement about an axis within said field winding and for axial movement in response to axially directed magnetic forces of said winding;
    (b) friction means effective to sequentially engage each of said surfaces of said driven member in response to said axial movement of said armature; and
    (c) means assisting the frictional engagement between said surfaces of said driven member and said friction means.

2. The apparatus as in claim 1, in which said friction means includes relatively axially and rotationally movable friction rollers, each having a conical surface mateable with one of the surfaces of said driven means, said rollers being brought sequentially into engagement with said surfaces in response to rotation and axial movement of said armature.

3. The apparatus as in claim 2, in which engagement of one of said rollers with one surface of said driven member causes relative rotation between said rollers, said friction means having camming elements effective to exert an axially directed force on said other roller in response to said relative rotation.

4. The apparatus as in claim 3, in which said camming elements exert a force proportional to the output torque of said armature.

5. The apparatus as in claim 2, in which said friction means further includes release means effective to automatically release said frictional engagement between said rollers and surfaces upon the overrunning of said flywheel with respect to said armature.

6. The apparatus as in claim 5, in which said release means comprises a helix coil spring providing the sole driving rotational connection from said armature to at least one of said friction rollers in one rotational direction.

7. The apparatus as in claim 1, in which said supporting means comprises bearings supporting said armature for rotation and permitting axial movement of said armature, said means also comprises a resilient member to normally bias said armature to a first axial position and to allow said armature to assume a second axial position when said resilient member is overcome.

8. The apparatus as in claim 2, in which said rollers and driven member are each comprised of metal.

9. The apparatus as in claim 8, in which said means assisting frictional engagement comprises at least one resilient ring carried by said driven member and having a higher coefficient of friction than either said rollers or driven member while being effective to warp tangentially along the periphery of the roller to thereby extend the area of engagement between said roller and said driven member.

10. In an engine starting apparatus having an annular driven member carried by the engine flywheel and a starter motor with a field winding and armature, said driven member having opposed conical surfaces related to each other to present a common crest forming the outermost radial extremity of said driven member, the combination comprising:
    (a) supporting means effective to support said armature for rotary movement about an axis within said field winding and for axial movement in response to axially directed magnetic forces of said winding;
    (b) a sleeve slidably mounted on said armature and coupled thereto for conjoint rotation;
    (c) a response roller integral with said sleeve;
    (d) a control roller slidably mounted on said sleeve and coupled thereto for rotation with said sleeve in one driving rotatable direction, said control roller being engageable with one of said conical surfaces of said driven member in response to said axial movement of said armature, each of said control and response rollers carrying a conical surface mateable with one of said opposed conical surface of said driven member; and
    (e) camming means effective to bring said response roller into engagement with the other of said conical surfaces of said driven member in response to relative rotation between said control and response rollers.

11. The apparatus as in claim 9, in which said camming means has a first camming surface on said sleeve and a second camming surface on said control roller, said camming means including a plurality of camming elements disposed between said camming surfaces, said first and second camming surfaces being disposed transverse to the armature axis for camming in a direction along said axis.

12. The apparatus as in claim 9, in which one-way resilient means provides the connection between said control roller and sleeve for conjoint rotation in one driving rotatable direction, said resilient means providing an automatic release of the gripping force of said rollers with said driven member when said driven member overruns with respect to said armature.

13. The apparatus as in claim 12, in which said resilient means comprises a helix spring having one end connected to said control roller and the other end connected to said armature, said spring being effective to transmit rotary drive in only one direction.

14. The apparatus as in claim 10, in which the supporting means for said armature includes a resilient member effective to return said armature to its initial position upon the cessation of magnetic forces.

15. The apparatus as in claim 10, in which said rollers and driven members are metallic providing a metal-to-metal interengagement, said apparatus further comprising means for assisting the metallic frictional engagement between said rollers and driven member.

16. The apparatus as in claim 15, in which said means for assisting frictional engagement comprises an annular recess in a conical surface of said driven member and a resilient ring disposed in said recess but projecting outwardly therefrom, said resilient ring having a coefficient of friction higher than said rollers or driven member, said resilient ring being compliant to the surface of said roller to increase the interengaging contact surface area.

17. The apparatus as in claim 10, in which the opposed conical surfaces of said driven member include an angle therebetween of about 95°–160°.

* * * * *